July 10, 1923.
C. N. REYNOLDS, JR
1,461,677
SLIDE RULE
Filed Aug. 27, 1921
2 Sheets-Sheet 1
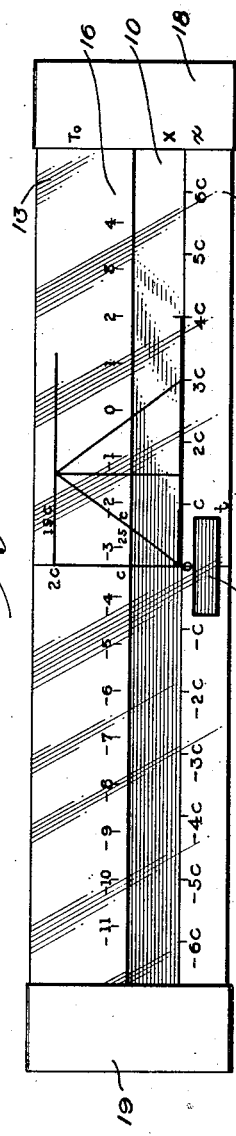
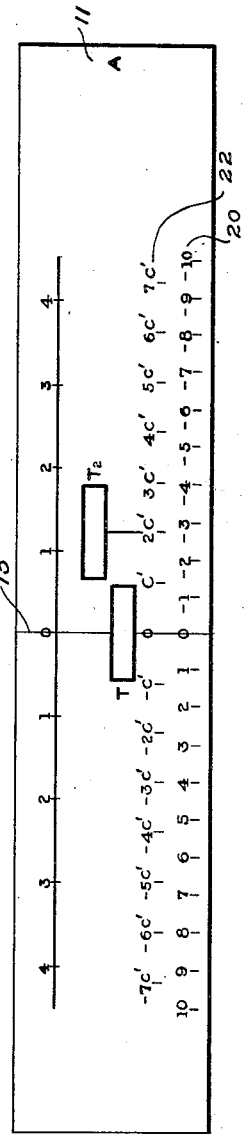
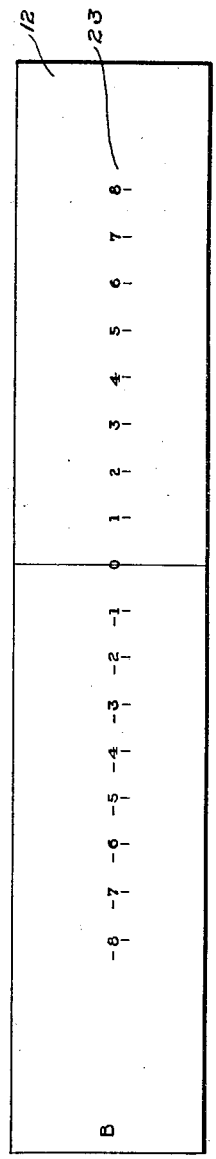
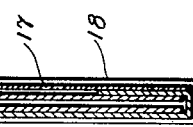
WITNESSES
INVENTOR
CLARENCE N. REYNOLDS, JR.
BY
ATTORNEYS

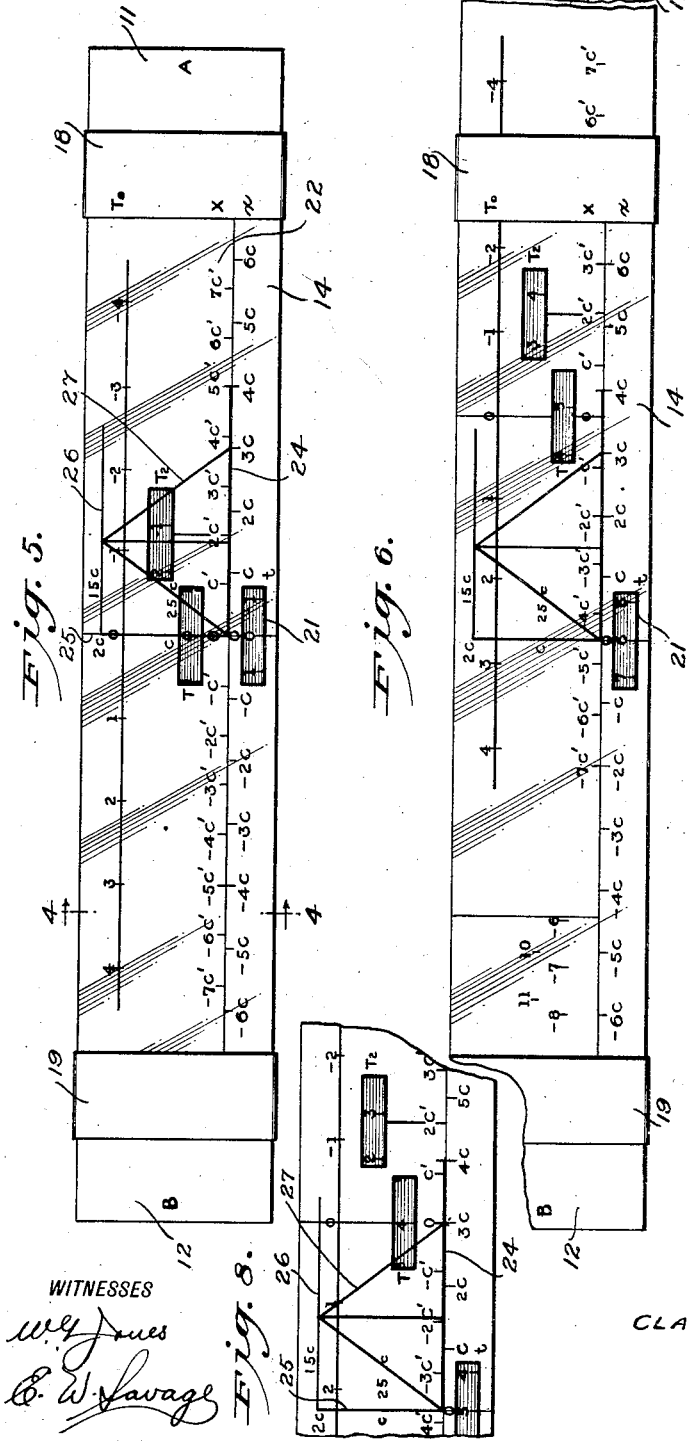

Patented July 10, 1923.

1,461,677

UNITED STATES PATENT OFFICE.

CLARENCE NEWTON REYNOLDS, JR., OF PROVIDENCE, RHODE ISLAND.

SLIDE RULE.

Application filed August 27, 1921. Serial No. 496,028.

*To all whom it may concern:*

Be it known that I, CLARENCE NEWTON REYNOLDS, Jr., a citizen of the United States, and a resident of Providence, in the county of Providence and State of Rhode Island, have invented a new and Improved Slide Rule, of which the following is a full, clear, and exact description.

The general object of the invention is to provide a means for illustrating the implications of Einstein's restricted theory of relativity.

This object is accomplished by providing a slide rule, including slides, which has a plurality of scales marked thereon for illustrating the apparent effect of the uniform relative motion of two observers upon their respective units of time and space.

The slide rule is constructed for the purpose of illustrating the units of measure used by two observers, one of whom moves with a velocity equal to $v$ which as measured by the stationary observer is three-fifths of $c$, the velocity of light.

This and other objects of the invention will be more clearly understood from the following detailed description and accompanying drawings.

Figure 1 is a plan view of the body of the slide rule with the transparent plate superimposed;

Figure 2 is a plan view of the A slide showing the scales and locations of the windows.

Figure 3 is a plan view of the B slide showing the scale marked thereon;

Figure 4 is a cross section along the line 4—4, Figure 5;

Figure 5 is a plan view of the slide rule with the slides mounted in position for operation;

Figure 6 is a plan view of the slide rule after it has been operated to give the solution of Problem I.

Figure 7 is a plan view of the slide rule after it has been operated to give the second solution of Problem I, when the B slide is used.

Figure 8 is a plan view of the slide rule after it has been operated to show that the velocities of light as measured on two objects moving relatively one to another are equal.

Referring to the above-mentioned drawings, the slide rule consists of a body portion 10 and two slides 11 and 12, which are also designated as slides A and B, respectively. The body portion is constructed by folding the upper and lower edges of a sheet of any suitable material inward to form guides 13 and 14. On the guides 13 and 14 two scales are marked. The scale on guide 14 is designated the $x$ scale and is used to indicate longitudinal distances, as apparent to a stationary observer. The units of this scale are in this particular rule half an inch in length. The zero point of the scale is located on a base line 15 which extends transversely across the body of the slide rule midway between the ends. The units to the right are positive and the units to the left of the base line are negative.

On the upper guide 13 a scale 16 for measuring time is marked and the units of this scale are a function of the units of the $x$ scale. It has been found necessary to make the units of this scale 16 of a length equal to $$\frac{\frac{v}{c}}{\sqrt{1-\frac{v^2}{c^2}}} \times \text{the units of the } x \text{ scale,}$$

in order to demonstrate the implications of the Einstein restricted theory of relativity $v$ is the velocity of a moving observer represented by the slide A, which will be described in the subsequent paragraph, and $c$ is the velocity of light. This scale has its zero point located a distance to the right of the base line 15 equal to $\frac{1}{1-\frac{v^2}{c^2}}$ times the distance from the base line to the window $T_2$ with which it co-operates and which will be described in the subsequent paragraph.

Attached to the body portion 10 is a transparent plate 17 on which is marked a scale for measuring transverse distances. The plate is attached in any suitable and simple manner such as providing bands 18 and 19 that may be attached to both the plate 17 and the body portion 10.

The slide 11, which is also denominated as the A slide, has a plurality of scales marked thereon. Scale 20 is a function of the $x$ scale and the units are $\frac{v}{c}$ times the units of the $x$ scale. In this particular construction this product will be $\frac{3}{5} \times \frac{1}{2}$ which equals $\frac{3}{10}$ of an inch. The scale 20 is used in conjunction with the window 21 to provide a time scale. This window is also designated $t$ and is on the base line 15. Window $t$ is used to measure time on scale $x$, as apparent to a stationary observer. This scale 20 has its negative units to the right of the base line 15 and the positive to the left. Another scale 22, also designated the X scale, is provided on the slide A. This scale is used to indicate horizontal distances as apparent to a moving observer. Its units are $$\sqrt{1 - \frac{v^2}{c^2}} \times \text{the units of the } x \text{ scale,}$$

or $\frac{4}{5} \times \frac{1}{2}$ an inch, which equals $\frac{2}{5}$ of an inch.

The two windows T, $T_2$ are located in the slide A. Window T is mounted on the base line 15 and gives the time used by an observer on the slide at the zero point of the X scale. The windows $T_2$ which has been mentioned in a previous paragraph, is located on the scale a predetermined number of units to the right of the base line; in this case $2^c$ units to the right, as shown on the X scale. This window $T_2$ gives the time used by an observer on a morning slide at the point $2^c$ of the X scale. The window $T_2$ co-operates with the scale 16 which has already been described. If only one slide A is used, a scale will be marked on the body of the slide 10 to co-operate with the window T. The units of this scale will be equal to the units of the scale 16 which are $$\frac{\frac{v}{c}}{\sqrt{1 - \frac{v^2}{c^2}}} \times \text{units of the } x \text{ scale.}$$

The zero of this will be located on the base line 15 and the positive units will extend to the right. Located on the upper edge of the A slide is a $T_0$ scale, the zero point of which is located on the base line 15. The units of this scale are $$\frac{\sqrt{1 - \frac{v^2}{c^2}}}{\frac{v}{c}} \times \text{the units of the } x \text{ scale.}$$

This T zero scale gives the correction to be added to the reading of the T window to give the time at any particular point of the moving slide. When the A slide is placed in position the lower portion fits under the guide 14 and the upper edge fits over the guide 13. A B-slide may be included in the slide rule and marked on this B slide will be a scale 23, the units of which would be equal to the units of the scale described above for co-operating with the T window. The advantage of this B slide is that it may be set in a certain predetermined position depending on the problem to be solved and the correct reading of T may be obtained without using the $T_o$ scale. $v$ the velocity of a moving observer represented by the slide A is equal to $\frac{3}{5}$ the velocity of light only in the case of the particular rule illustrated in the drawings. A rule might be constructed for any value of $v$ on exactly the same principle as set forth in the application.

A couple of problems will hereafter be given, described and illustrated in order to more clearly explain the advantages and operation of the above described slide rule:

Problem I. Given an event at a point for which $x = 5^c$ at a time $t = 6$ seconds, find the corresponding values of X which is used for the moving observer to measure horizontal distances and the reading of the window T used by an observer on the slide at the zero of the X scale. The solution of this problem is illustrated in Figure 6. The slide A is moved to the right until the window $t$ reads 6 seconds, then the point on the X scale opposite the point $5^c$ on the $x$ scale represents the value of $X = \frac{7}{4}c$. Directly above this point we find the reading on the $T_o$ scale to be $T_o = -1$. The reading of the T window is $4\frac{3}{4}$ but the reading of the $T_o$ scale must be added to the reading of the T window since the $T_o$ scale gives the correction to be added to the reading of the T window to give the time at any particular position on the moving slide. Therefore, we get $T = 3\frac{3}{4}$. The above solution is obtained without using the B slide.

The slide rule is adjusted until the five zero points are in line along the base line 15.

Solution using the B slide. The B slide is moved to the right until the window T reaches $-1$. The A slide is then moved to the right until window $t$ indicates 6 seconds, and the window T then indicates $3\frac{3}{4}$ seconds.

Provided on plate 17 is a diagram which may be used in conjunction with the slide to show that the velocities of light, as shown on the moving slide A and the body of the slide rule 10 are equal. This is the fundamental principle of the restricted theory of relativity. The diagram consists of a base line 24 having its origin located at zero on the base line and extending $4^c$ units to the right. Extending upward and at right angles to the base line 24 is a line 25 which coincides with the base line 15. This line is marked off in units equal to the units of the $x$ scale. Drawn parallel to the line 24 and through the point $2^c$ in the line 25 is line 26. Constructed on the line 24 and having a base equal to $3^c$ units is an isosceles triangle 27 which has its apex in the line 26. The apex of the isosceles triangle will therefore be $1.5^c$ units to the right of the line 25. The lengths of the legs of the isosceles triangle are $2.5^c$ units. The use of this diagram will be more clearly understood by reference to a problem, the solution of which will be given in the following paragraph and illustrated in Figure 8. The problem is to show that the velocities of light as measured on the body of the slide rule and the slide are equal. This is the fundamental principle of the restricted theory of relativity.

Solution of above problem: Let a light signal be sent from the point $X=0$ on the moving slide to a mirror vertically above that point, and let it return to the point $X=0$ at the end of 5 seconds, as indicated by the window $t$. Then at the end of the 5 seconds the window $t$ indicates 5 and the point $X=0$ lies opposite the point $x=3^c$. The light signal will have covered the path indicated by the equal sides of the isosceles triangle on the celluloid strip. The length of this path is twice $2.5^c$, or $5^c$, as measured by the stationary observer. Therefore, the stationary observer obtains for the velocity of light the value $c$. From the point of view of the moving observer, the light traverses the vertical line $2^c$ units long, and returns at the end of 4 seconds as indicated by his clock T. He, therefore, concludes that the velocity of light is the total distance covered, or $4^c$, divided by four, or $c$, the value obtained by the stationary observer.

Case 2. Let a light signal be sent from the point $X=0$, when the slides are in the initial position, and let it proceed toward the right for 4 seconds. At the end of the 4 seconds the window $t$ will indicate 4 and the light signal will be at the point $x=4^c$. Opposite this point we find the reading $X=2^c$, and the window reading $T=2$. Therefore, the moving observer concludes that the light has covered a distance of $2^c$ in 2 seconds, while from the point of view of the stationary observer, it has covered a distance of $4^c$ in 4 seconds. In both cases, the observed velocities are equal to $c$.

Another purpose of my slide rule is the solution of a set of non-homogeneous linear algebraic equations:

$$ax + bt = X$$
$$cx + dt = T$$

In this case the rule would be so constructed that the units on the $t$ scale would be $-\frac{b}{a}$ times the unit on the small $z$ scale X " " " $\frac{1}{a}$ " " " " " " " "

T " " " $\frac{-b}{ad-bc}$ " " " " " " " "

$T_0$ " " " $-\frac{1}{c}$ " " " " " " " "

For the scale as constructed $$a = \frac{5}{4},\ b = -\frac{3}{4}c,\ c = -\frac{3}{4}c,\ \text{and}\ d = \frac{5}{4},$$

and we see that essentially my model is a device for obtaining any two of the quantities $x$, $t$, X, T, when the other two are given, the four quantities being related to each other by the following equations of transformation due to Lorentz:

$$\frac{5}{4}x - \frac{3}{4}ct = X$$

$$-\frac{3}{4c}x + \frac{5}{4}t = T$$

Claims.

1. In a slide rule for illustrating the implications of Einstein's restricted theory of relativity, the combination of a body having a scale marked thereon for indicating longitudinal velocities and provided with a window, a slide mounted in the body and provided with windows, said slide having a scale for indicating time corresponding to the longitudinal velocities indicated by the scale marked on the body, and a second scale for indicating the transverse velocities corresponding to the longitudinal velocities, and a second slide mounted on the body having a scale marked thereon for indicating time for transverse velocities.

2. In a slide rule for illustrating the implications of Einstein's restricted theory of relativity, the combination with a body having a scale marked thereon for indicating the longitudinal velocities, two slides mounted in the body, one above the other, one slide being provided with windows, two scales marked on the slide provided with windows one for indicating the time corresponding to the longitudinal velocities and one for indicating transverse velocities relating to the longitudinal velocities, and a scale marked on the other slide for indicating time of the transverse velocities.

3. In a device of the class described, the combination of a body having a scale marked thereon for indicating velocities, a diagram for indicating the path of light to moving and stationary observers mounted in the body, a slide in the body having a time scale for indicating time to the stationary observers, and another slide having a time scale marked thereon for indicating time to the moving observers, the slides being mounted one above the other.

4. A slide rule of the character and for the purposes set forth, comprising a body having two parallel and spaced scales and provided with a window adjacent one edge and at the center of its length, a slide mounted in the body and having three scales, two at one side of its longitudinal center and one at the other side, the slide being provided with two longitudinally extending windows in the space between the scales, one window being at the transverse center of the slide and the other at one side of the transverse center and in a different plane from that of the first window, and a second slide in the body and having a scale at its longitudinal center.

5. A slide rule of the character described, comprising a body having a plurality of scales and provided with a window adjacent one edge at the center of its length, and a slide mounted in the body and having three scales, two at one side of its longitudinal center and one at the other side, the slide being provided with two windows in different planes and adjacent each other, one of the windows being at the middle of length of the slide.

6. A slide rule of the character described, comprising a body having longitudinal guides, each provided with a scale and one with a window adjacent one edge and at its center of length, and a slide mounted in the body and provided with three scales and two windows, two of the scales being at one side of the longitudinal center of the slide and one at the other side, the windows being in different planes and adjacent each other, one of the windows being at the transverse center of the slide and extending on opposite sides of said center.

CLARENCE NEWTON REYNOLDS, Jr.